(12) United States Patent
Daniels et al.

(10) Patent No.: US 7,939,756 B2
(45) Date of Patent: May 10, 2011

(54) MODULAR ELECTRICAL WALL COVER SYSTEM

(75) Inventors: James Daniels, Stokesdale, NC (US); William Spencer, Burlington, NC (US)

(73) Assignee: Liberty Hardware Mfg. Corp., Winston-Salem, NC (US)

( * ) Notice: Subject to any disclaimer, the term of this patent is extended or adjusted under 35 U.S.C. 154(b) by 342 days.

(21) Appl. No.: 12/204,117

(22) Filed: Sep. 4, 2008

(65) Prior Publication Data

US 2010/0051312 A1    Mar. 4, 2010

(51) Int. Cl.
*H02G 3/14* (2006.01)
(52) U.S. Cl. ............. 174/66; 174/67; 220/241; 220/242
(58) Field of Classification Search .................. 174/480, 174/481, 50, 53, 57, 58, 66, 67; 220/3.2–3.9, 220/4.02, 241, 242; 439/535, 536
See application file for complete search history.

(56) References Cited

U.S. PATENT DOCUMENTS

| 801,536 | A | | 10/1905 | Marshall | |
|---|---|---|---|---|---|
| 1,717,871 | A | | 6/1929 | Both | |
| 3,437,738 | A | * | 4/1969 | Wagner | 174/66 |
| 3,735,020 | A | | 5/1973 | Licata | |
| 3,953,933 | A | | 5/1976 | Goldstein | |
| 4,972,045 | A | | 11/1990 | Primeau | |
| 5,073,681 | A | * | 12/1991 | Hubben et al. | 174/66 |
| 5,455,388 | A | * | 10/1995 | Pratt | 174/67 |
| 5,696,350 | A | | 12/1997 | Anker | |
| 5,700,978 | A | | 12/1997 | Huff | |
| 5,744,750 | A | | 4/1998 | Almond | |
| 5,961,345 | A | * | 10/1999 | Finn et al. | 439/536 |
| 5,981,875 | A | | 11/1999 | Kesler | |
| 6,005,189 | A | | 12/1999 | Anker | |
| 6,570,091 | B1 | * | 5/2003 | Kesler et al. | 174/67 |
| 7,102,081 | B2 | | 9/2006 | Xu | |
| 7,633,009 | B1 | * | 12/2009 | Baldwin | 174/67 |
| 7,683,257 | B1 | * | 3/2010 | Shotey et al. | 174/66 |
| 7,763,798 | B1 | * | 7/2010 | Shotey et al. | 174/66 |

* cited by examiner

*Primary Examiner* — Angel R Estrada
(74) *Attorney, Agent, or Firm* — Carlson, Gaskey & Olds

(57) ABSTRACT

A modular electrical cover plate assembly has an outer frame having two side walls, a top wall and a bottom wall. At least one cover plate is mounted within the frame. Locking structure is provided for locking the frame to the cover plate.

17 Claims, 5 Drawing Sheets

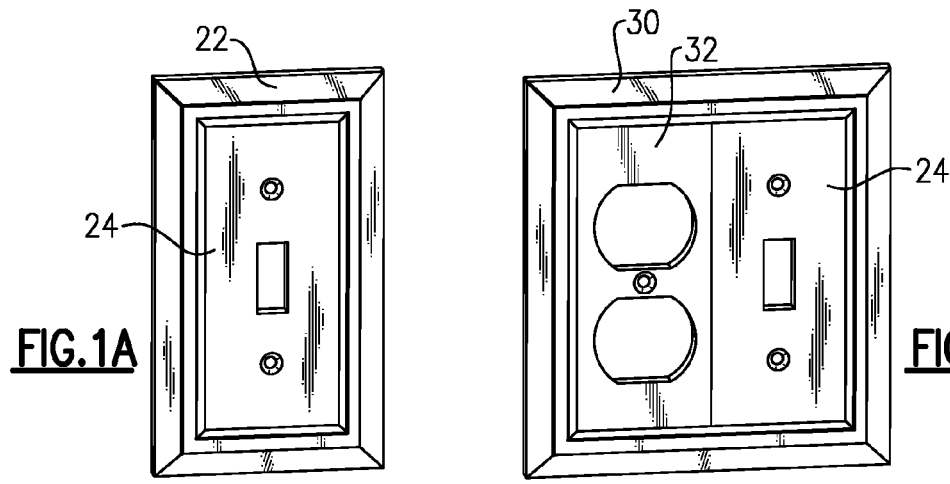
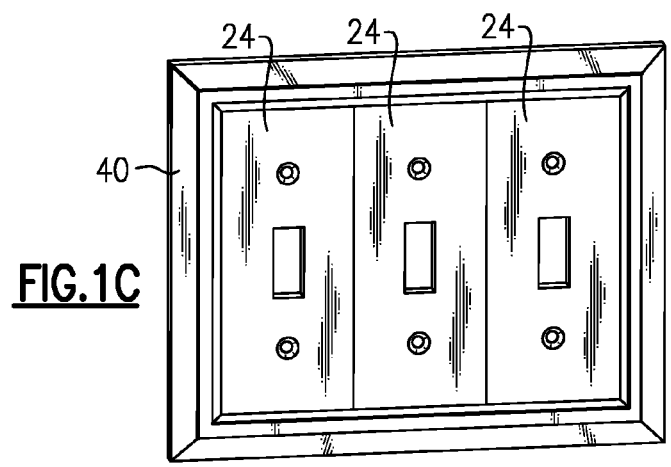
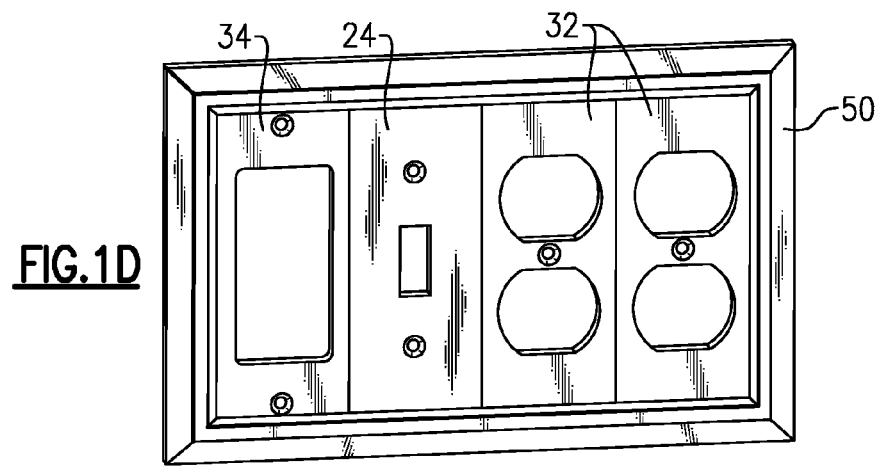

MODULAR ELECTRICAL WALL COVER SYSTEM

BACKGROUND OF THE INVENTION

This application relates to an electrical wall cover system wherein modular individual covers mate with an outer frame.

As electrical accessories become more numerous and complex, the related wall outlets also require the ability to provide more variety. As an example, there are single gang, double gang, triple gang, and quad gang wall plates that are widely utilized. These wall plates would cover one, two, three, and four (respectively) electrical items. In modern installations, an electrical receptacle, a switch, etc. may be utilized at any location in any wall covering It has been proposed in the past to have modular cover plate systems, with the plate coverings being assembled together with interfitting structure. These proposed systems have been somewhat deficient, at least in that the outer covering frame has not been attached to the individual covering plates, and thus assembly has been more complex than may be desirable.

SUMMARY OF THE INVENTION

In a disclosed embodiment of this invention, a frame for receiving at least one wall plate has structure which interfits with the wall plate to secure the wall plate within the frame. In disclosed embodiments, there is mating structure between the wall plates such that they can be assembled together in multiple assemblies, and also interfitted with the frame.

These and other features of the present invention can be best understood from the following specification and drawings, the following of which is a brief description.

BRIEF DESCRIPTION OF THE DRAWINGS

FIG. 1A shows a single gang wall plate.
FIG. 1B shows a dual gang wall plate assembly.
FIG. 1C shows a triple gang wall plate assembly.
FIG. 1D shows a quad gang wall plate assembly.

DETAILED DESCRIPTION OF THE PREFERRED EMBODIMENT

Figure 2A:
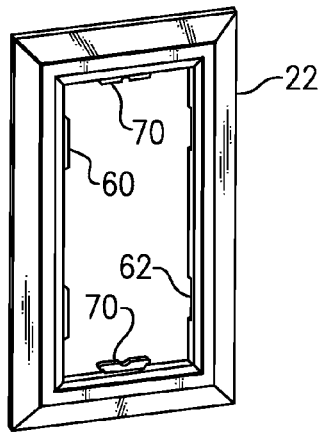
FIG. 2A shows a single gang frame option.

FIG. 1A shows a single gang wall plate cover having an outer frame 22, and an inner wall plate subcomponent, here a switch cover 24.

FIG. 1B shows a dual gang assembly with a frame 30 shown receiving a duplex receptacle outlet cover plate 32, and a switch cover plate 24.

FIG. 1C shows a triple gang frame 40 receiving three switch cover plates 24.

FIG. 1D shows a quad gang frame 50 receiving two duplex receptacle cover plates 32, a switch cover plate 24, and a rocker switch cover plate 34.

As can be appreciated from FIGS. 1A-1D, the present invention allows any number of arrangements of various cover plate subcomponents within a frame. Thus, a consumer or construction person can provide the appropriate arrangement for any particular electrical installation. Historically, one needed to purchase a manufactured cover plate having the exact required relationship, which required the provision of a large number of potential arrangements.

FIG. 2A shows the single gang frame 22 having male interconnecting portion 60 and female interconnecting portion 62 on opposed side walls. In addition, locking teeth 70 are also formed on the vertical ends of the frame 22.

Figure 2B:
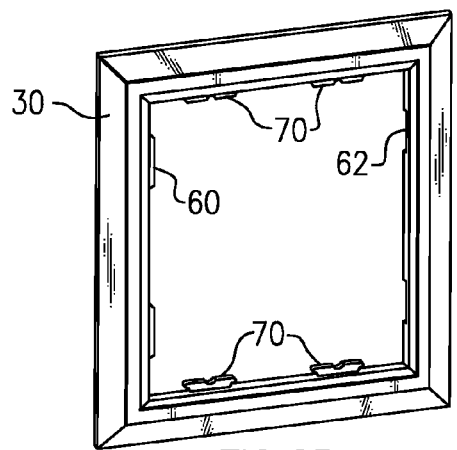
FIG. 2B shows a double gang frame option.

FIG. 2B shows the double gang frame 30 having similar structures, with locking teeth 70 associated with the location of each of the cover plate subassemblies as shown previously.

Figure 2C:
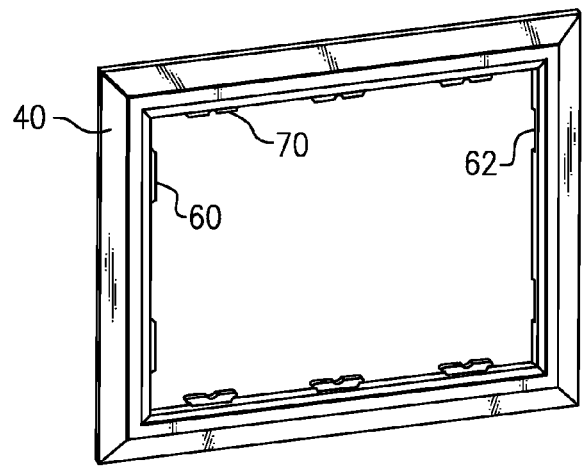
FIG. 2C shows a triple gang frame option.
Figure 2D:
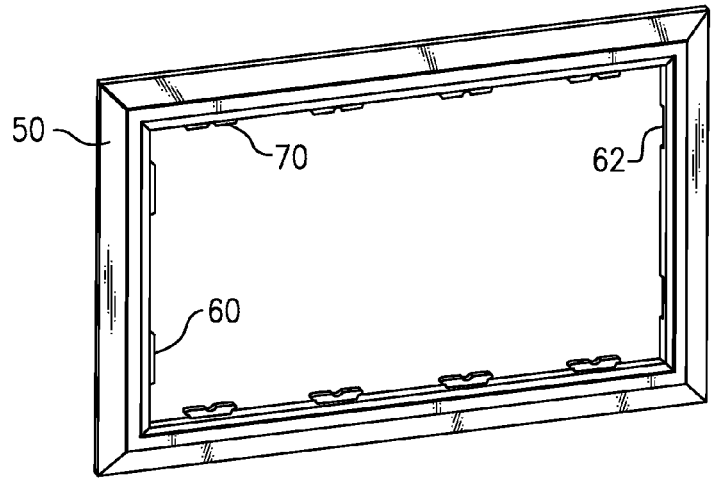
FIG. 2D shows a quad gang frame option.

FIG. 2C shows the triple gang 40 having three sets of the locking teeth 70. FIG. 2D shows the quad gang frame 50 having four sets of the locking teeth 70.

Figure 3A:
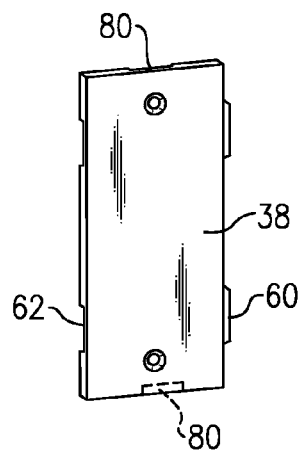
FIG. 3A shows one possible wall plate subcomponent.
Figure 3B:
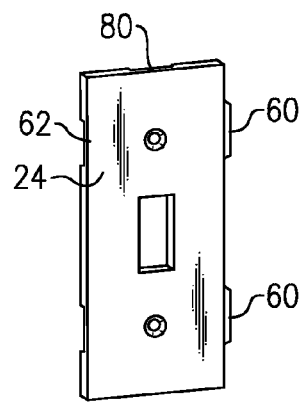
FIG. 3B shows another wall plate subcomponent.
Figure 3C:
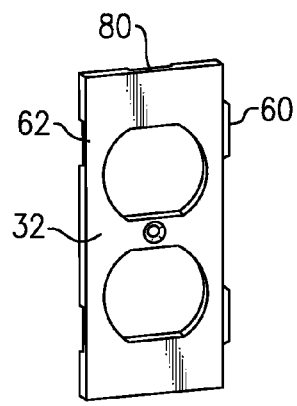
FIG. 3C shows another wall plate subcomponent.
Figure 3D:
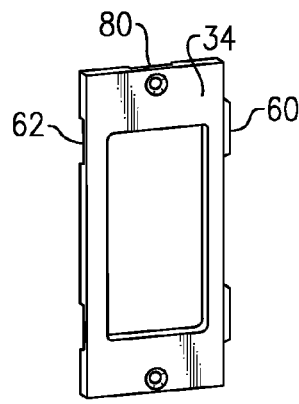
FIG. 3D shows another wall plate subcomponent.
Figure 3E:
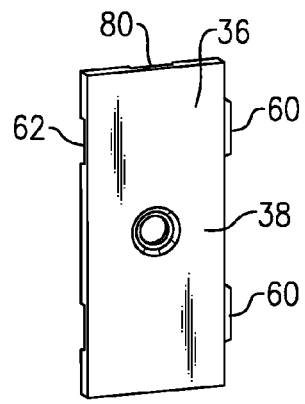
FIG. 3E shows another wall plate subcomponent.

FIGS. 3A-3E show several cover plate subassembly options. FIG. 3A shows that a blank panel 38 has the female interlocking portion 62 and the male interlocking portion 60. Further, a notch 80 is shown that will receive the locking teeth 70. A similar notch 80 is formed at a lower end of the plate 38, and is illustrated in dotted line in this figure. While the lower notch 80 is not shown in FIGS. 3B-3E, it should be understood that each of those optional cover plate subcomponents would typically have such a lower notch also. FIG. 3B shows the switch cover plate 24 having similar structure. FIG. 3C shows the duplex outlet cover plate subcomponent 32 having similar structure. FIG. 3D shows the rocker panel cover plate 34 having the similar structure, and FIG. 3E shows a coaxial cover plate 36 having the same structure.

As is clear from consideration of FIGS. 2A-2D and FIGS. 3A-3E, and from the operation use of the female and male interlocking portions, the male interlocking portions could be defined as a "tooth" and the female interlocking portions defined as a "recess." The teeth 60 are formed on one side wall, here the left side, of the frames 22, 30, 40, and 50, while the recesses 62 are formed on an opposed side wall, here the right side, and at about the same height or position. Similarly, the recesses are formed on one side wall, here the left side, of each of the cover plates 38, 24, 32, and 34. The teeth 60 are formed on the opposed, or right side wall. In this manner, any rearrangement of the several cover plates within the several frames is easily achieved and available.

Figure 4A:
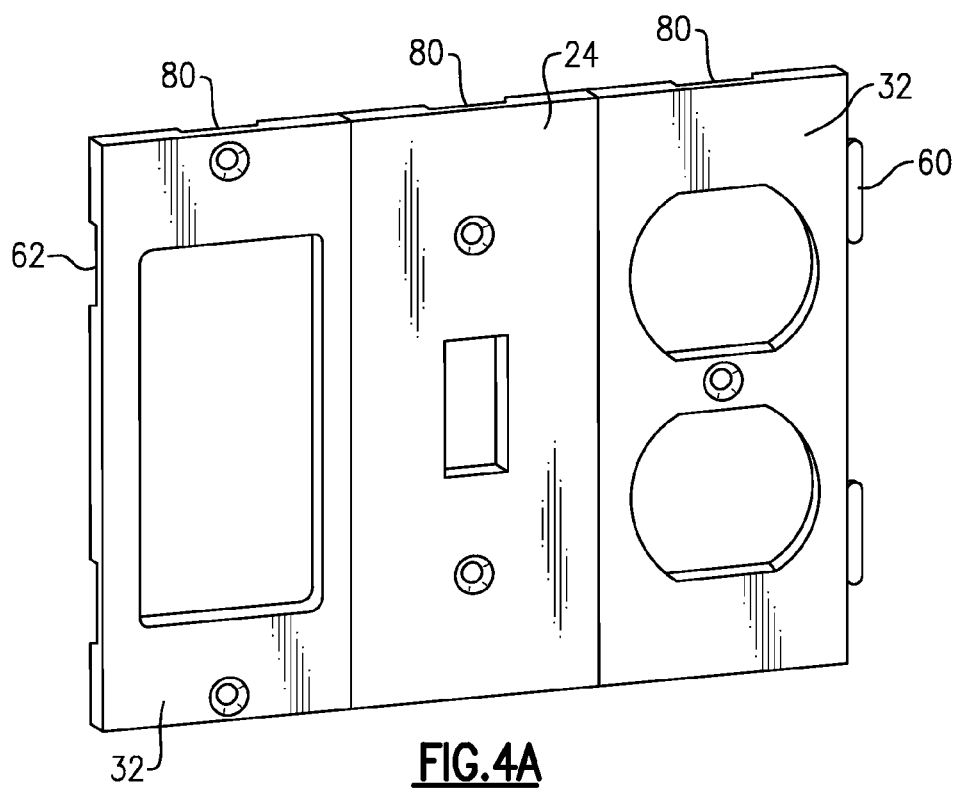
FIG. 4A shows one possible arrangement of three wall plate subcomponents.
Figure 4B:
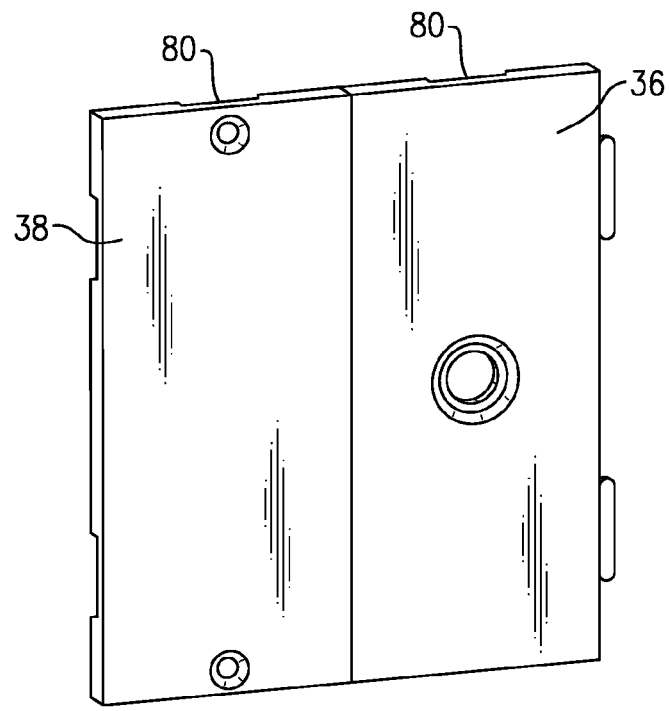
FIG. 4B shows another arrangement of two wall plate subcomponents.
Figure 5:
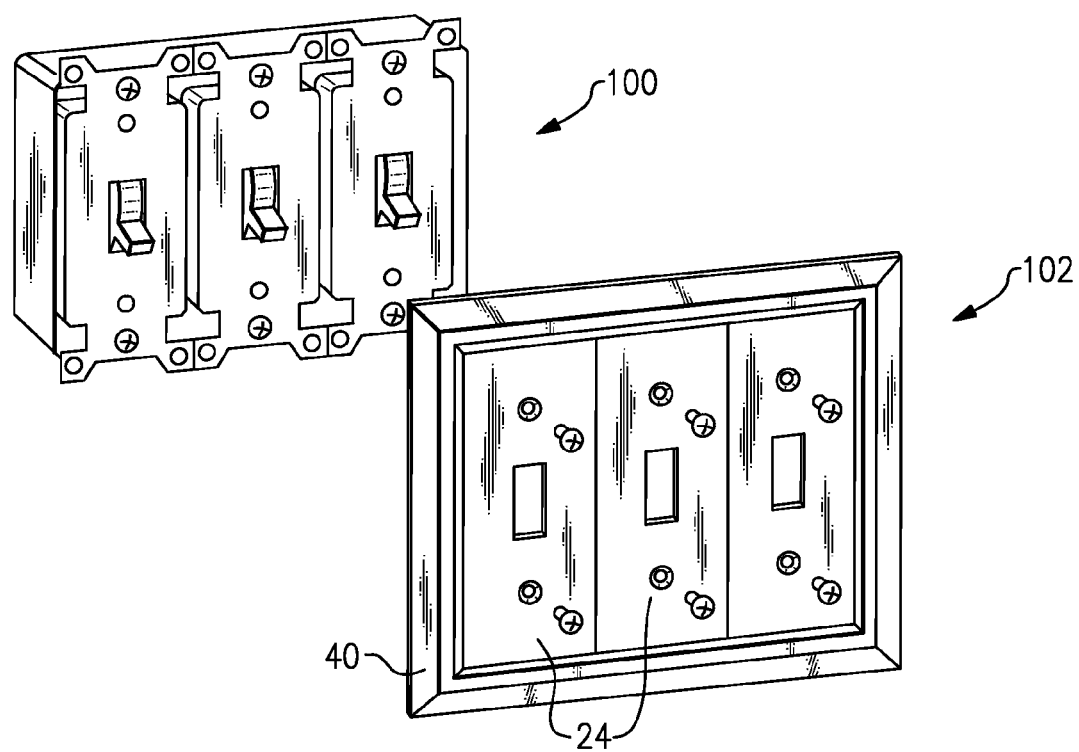
FIG. 5 shows the assembly of the subassembled frame and wall plate subcomponents onto an electrical installation.

FIGS. 4A and 4B show that the cover plate subcomponents may be assembled into a desired grouping, such as shown in FIG. 4A wherein there is a rocker panel plate 32, a switch cover plate 24, and a duplex receptacle cover plate 32. FIG. 4B shows a distinct arrangement having a blank plate 38 and a coaxial plate 36. An assembler will assemble the various cover plate subcomponents as shown in FIGS. 4A and 4B, and then mount them within the appropriate frame (FIGS. 2A-2D). The locking teeth 70 snap into recesses 80, and the female interlocking portion 62 on one end of the assembly of cover plate subcomponents locks onto the male interlocking portion on the frame, while the male interlocking portion 60 on the other end of the assembled cover plate subcomponents locks into the similar female structure on the frame.

The subassembled frame and cover plates 102 may be mounted on an electrical installation 100. The use of the frame having interlocking structure (60, 62 and/or 70) allows the entire subassembly 102 to be assembled together before mounting, and thus, the assembly is simplified, and the overall appearance of the assembled modular cover plate is improved compared to the prior art.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A modular electrical cover plate assembly comprising:
a frame having two side walls, a top wall and a bottom wall;
at least one cover plate mounted within said frame;
locking structure for locking said frame to said at least one cover plate;
there being plural cover plates attached to said frame, and said cover plates having different configurations;
each of said cover plates and said frame having interlocking male and female structure such that they can be attached to each other, said cover plates also having two side walls, a top wall and a bottom wall, each of said cover plates being secured within said frame at each of said top wall and said bottom wall; and
a left hand side wall of said cover plate provided with one of said male and female interlocking structure and the right hand side wall of said cover plate is provide with the other of said male and female interlocking structure, and said cover plates are provided with the other of said female and male interlocking structure on a left hand side wall and said cover plates being provided with the one of said male and female interlocking structure on a right hand side wall, each of said side walls of said frame and said cover plates being provided with said interlocking structure at approximately the same location along said side walls.

2. The assembly as set forth in claim 1, wherein one of said frame and said cover plate has a tooth that extends into a recess in the other of said frame and said cover plate to provide said locking structure.

3. The assembly as set forth in claim 2, wherein there is a pair of said teeth and a pair of said recesses, and said teeth being positioned on said top and bottom walls of said cover plate to securely hold said cover plate to said frame.

4. The assembly as set forth in claim 2, wherein there are a plurality of cover plates mounted within said frame, and there being at least one tooth and at least one recess for securely holding each of said cover plates to said frame.

5. The assembly as set forth in claim 1, wherein said frame having male and female interlocking structure of a similar configuration to that on said cover plates to provide said locking structure.

6. The assembly as set forth in claim 5, wherein one of said frame and said cover plate has a tooth that extends into a recess in the other of said frame and said cover plate to provide said locking structure.

7. The assembly as set forth in claim 6, wherein there is a pair of said teeth and a pair of said recesses, and said teeth being positioned on said top and bottom walls of said cover plate to securely hold said cover plate to said frame.

8. The assembly as set forth in claim 7, wherein there are a plurality of cover plates mounted within said frame, and there being at least one tooth and at least one recess for securely holding each of said cover plates to said frame.

9. The assembly as set forth in claim 1, wherein said frame is dual gang.

10. The assembly as set forth in claim 1, wherein said frame is triple gang.

11. The assembly as set forth in claim 1, wherein said frame is quad gang.

12. The assembly as set forth in claim 1, wherein said cover plate is a duplex receptacle cover plate.

13. The assembly as set forth in claim 1, wherein said cover plate is a switch cover plate.

14. The assembly of claim 1, wherein said male interlocking structure is on said left hand side of said frame, and on said right hand side of said cover plates, and said female interlocking structure is on said right hand side of said frame, and said left hand side of said cover plates.

15. A modular electrical cover plate assembly comprising:
a frame having two side walls, a top wall and a bottom wall;
plural cover plates mounted within said frame, said cover plates having different configurations;
locking structure for locking said frame to said cover plates;
each of said cover plates having locking male and female structure such that they are attached to each other;
said frame having male and female interlocking structure of a similar configuration to that on said cover plates to provide said locking structure;
one of said frame and said cover plates having a tooth that extends into a recess in the other of said frame and said cover plates to also provide said locking structure;
there being at least one tooth and at least one recess for securely holding each of said cover plates to said frame, said cover plates also having two side walls, a top wall and a bottom wall, each of said cover plates being secured within said frame at each of said top wall and said bottom wall; and
a left hand side wall of said cover plate provided with one of said male and female interlocking structure and the right hand side wall of said cover plate is provide with the other of said male and female interlocking structure, and said cover plates are provided with the other of said female and male interlocking structure on a left hand side wall and said cover plates being provided with the one of said male and female interlocking structure on a right hand side wall, each of said side walls of said frame and said cover plates being provided with said interlocking structure at approximately the same location along said side walls.

16. The assembly as set forth in claim 15, wherein there is a pair of said teeth and a pair of said recesses, and said teeth being positioned on said top and bottom walls of said cover plate to securely hold said cover plates to said frame.

17. The assembly of claim 15, wherein said male interlocking structure is on said left hand side of said frame, and on said right hand side of said cover plates, and said female interlocking structure is on said right hand side of said frame, and said left hand side of said cover plates.

* * * * *